United States Patent
Leonardo et al.

(10) Patent No.: US 10,283,926 B2
(45) Date of Patent: *May 7, 2019

(54) LASER SYSTEM WITH HIGHLY EFFICIENT, SINGLE-PASS, HARMONIC GENERATOR WITH ROUND OUTPUT BEAM

(71) Applicant: IPG Photonics Corporation, Oxford, MA (US)

(72) Inventors: Manuel J. Leonardo, San Francisco, CA (US); Mark A. Arbore, Los Altos, CA (US); Gregory L. Keaton, San Francisco, CA (US)

(73) Assignee: IPG PHOTONICS CORPORATION, Oxford, ME (US)

(*) Notice: Subject to any disclaimer, the term of this patent is extended or adjusted under 35 U.S.C. 154(b) by 0 days.

This patent is subject to a terminal disclaimer.

(21) Appl. No.: 15/727,313

(22) Filed: Oct. 6, 2017

(65) Prior Publication Data

US 2018/0034230 A1     Feb. 1, 2018

Related U.S. Application Data

(63) Continuation of application No. 14/209,908, filed on Mar. 13, 2014, now Pat. No. 9,912,114.

(Continued)

(51) Int. Cl.
*H01S 3/10*     (2006.01)
*H01S 3/00*     (2006.01)
(Continued)

(52) U.S. Cl.
CPC ......... *H01S 3/10092* (2013.01); *G02F 1/353* (2013.01); *H01S 3/0092* (2013.01);
(Continued)

(58) Field of Classification Search
CPC ........ H01S 3/0092; H01S 3/109; H01S 3/163; H01S 3/1666; H01S 3/108; H01S 3/067;
(Continued)

(56) References Cited

U.S. PATENT DOCUMENTS

| | | |
|---|---|---|
| 5,835,513 A | 11/1998 | Pieterse et al. |
| 5,850,407 A | 12/1998 | Grossman et al. |

(Continued)

FOREIGN PATENT DOCUMENTS

| | | |
|---|---|---|
| CN | 101103501 A | 1/2008 |
| CN | 102918726 A | 2/2013 |

(Continued)

OTHER PUBLICATIONS

Encyclopedia of Laser Physics and Technology "Spatial Walk-off", Dec. 22, 2016 12:21 PM, https://www.rp-photonics.com/spatial_walk_off.html.

(Continued)

*Primary Examiner* — Kinam Park
(74) *Attorney, Agent, or Firm* — JDI Patent; Joshua Isenberg; Robert Pullman

(57) ABSTRACT

A laser system includes a seed source optically coupled to an extra cavity harmonic generator system may produce a round, non-astigmatic third harmonic output beam from a nominally round, non-astigmatic, diffraction limited input fundamental beam from the seed source. The system may include a second harmonic generation crystal. An input fundamental beam size is expanded in a non-walkoff direction for the SHG crystal at the SHG crystal input face. A higher harmonic generation crystal has an output face oriented at an oblique angle of incidence in a non-walkoff direction for the HHG crystal such that an output higher harmonic beam size is contracted in this direction. Expansion of the input fundamental beam at the SHG crystal input (Continued)

face exceeds reduction of third harmonic beam at the HHG crystal output face.

46 Claims, 4 Drawing Sheets

Related U.S. Application Data

(60) Provisional application No. 61/783,686, filed on Mar. 14, 2013.

(51) Int. Cl.
  *G02F 1/35* (2006.01)
  *H01S 3/108* (2006.01)
  *H01S 3/109* (2006.01)
  *H01S 3/067* (2006.01)
  *G02F 1/37* (2006.01)
  *H01S 3/16* (2006.01)

(52) U.S. Cl.
  CPC .............. *H01S 3/108* (2013.01); *H01S 3/109* (2013.01); *H01S 3/10084* (2013.01); *G02F 2001/3503* (2013.01); *G02F 2001/354* (2013.01); *G02F 2001/3507* (2013.01); *G02F 2001/3509* (2013.01); *G02F 2001/372* (2013.01); *H01S 3/067* (2013.01); *H01S 3/06754* (2013.01); *H01S 3/06758* (2013.01); *H01S 3/1666* (2013.01)

(58) Field of Classification Search
  CPC .............. H01S 3/06754; H01S 3/10084; H01S 3/10092
  See application file for complete search history.

(56) References Cited

U.S. PATENT DOCUMENTS

| | | | | |
|---|---|---|---|---|
| 7,016,389 B2 * | 3/2006 | Dudley | ............... | H01S 3/09415 372/21 |
| 7,170,911 B2 * | 1/2007 | Katsura | ................... | H01S 3/109 372/22 |
| 7,443,903 B2 | 10/2008 | Leonardo et al. | | |
| 7,469,081 B2 | 12/2008 | Byer et al. | | |
| 7,529,281 B2 | 5/2009 | Leonardo et al. | | |
| 8,009,705 B2 | 8/2011 | Keaton et al. | | |
| 8,422,119 B1 * | 4/2013 | Keaton | ..................... | G02F 1/35 359/326 |
| 9,912,114 B2 * | 3/2018 | Leonardo | ................ | G02F 1/353 |
| 2006/0114946 A1 * | 6/2006 | Sun | .......................... | H01S 3/109 372/22 |
| 2006/0250677 A1 * | 11/2006 | Hoffman | ............... | G02F 1/3534 359/326 |
| 2011/0243163 A1 * | 10/2011 | Peng | ..................... | G02F 1/3534 372/22 |
| 2012/0224595 A1 * | 9/2012 | Caprara | ................ | H01S 3/0604 372/22 |

FOREIGN PATENT DOCUMENTS

| | | |
|---|---|---|
| JP | 2011197432 A | 10/2011 |
| JP | 5959815 B2 | 8/2016 |
| WO | 2006060160 A | 6/2006 |
| WO | 2011123254 A | 10/2011 |

OTHER PUBLICATIONS

Extended European Search Report for EP 14768972.3 dated Oct. 17, 2016.
Final Office Action for U.S. Appl. No. 14/209,908, dated Oct. 4, 2016.
International Search Report and Written Opinion for International Application No. PCT/US2014/026617, dated Jul. 17, 2014.
Non-Final Office Action for U.S. Appl. No. 14/209,908, dated May 5, 2016.
Notice of Allowance dated Jul. 6, 2017 for U.S. Appl. No. 14/209,908.
Office Action dated May 25, 2017 for Chinese patent application 201480027556.8.
U.S. Appl. No. 14/209,908 to Manuel J. Leonardo et al., filed Mar. 13, 2014.

* cited by examiner

LASER SYSTEM WITH HIGHLY EFFICIENT, SINGLE-PASS, HARMONIC GENERATOR WITH ROUND OUTPUT BEAM

CLAIM OF PRIORITY

This application is a continuation of U.S. patent application Ser. No. 14/209,908, filed Mar. 13, 2014, the entire contents of which are incorporated herein by reference. U.S. patent application Ser. No. 14/209,908 claims the priority benefit of U.S. Provisional Patent Application No. 61/783,686 filed Mar. 14, 2013, the entire contents of which are incorporated herein by reference.

FIELD OF THE INVENTION

This invention is related nonlinear optics and more particularly to a harmonic generator system that produces a rounded output beam.

BACKGROUND OF THE INVENTION

Wavelength-converted laser systems often use nonlinear optical crystals, such as lithium borate (LBO) to generate a visible wavelength output beam from an infrared input beam generated by a source laser. In second harmonic generation (SHG), for example, a non-linear process taking place in the crystal combines two photons of infrared input radiation to produce a photon of visible output radiation having twice the frequency of the input infrared radiation. In third harmonic generation (THG), second harmonic generation is combined with an additional nonlinear optical crystal that is phase matched to combine a photon of the SHG output with a photon of the infrared input to produce third harmonic generation (THG) output having three times the frequency of the infrared input radiation.

Nonlinear crystals such as LBO are often characterized by an anisotropic refractive index, and this has an effect on the shape of the wavelength-converted output beam. An anisotropic refractive index means that the index of refraction depends on the direction of propagation and polarization of radiation in the crystal. If an unpolarized beam is launched into such a crystal, it will typically exhibit double refraction: the beam will split into two polarized beams that are not collinear but whose directions of propagation differ by an angle called the walk-off angle.

When a crystal with an anisotropic refractive index such as LBO is used for second harmonic generation, there will be walk-off among the beams. Either the output beam travels at a walk-off angle with respect to the input beam, or else the input beam itself undergoes double refraction, breaking up into two beams, one of which propagates at the walk-off angle. Because of the walk-off, the output beam is distorted and ends up with a different shape than the input beam. Typically the input beam is circular, and the output beam is elliptical.

A commercially viable third harmonic system would preferably have all or most of the following attributes. Such a system would be reliable and offer thousands of hours of hands-off operation. Output parameters, such as mode quality, beam pointing, and beam position would remain constant or nearly constant over long periods of time. The third harmonic beam produced by such a system would be round. The beam would have minimal asymmetry, e.g., less than about 15%. The beam would have minimal astigmatism, typically <20% of the Rayleigh length. The beam would approximate a diffraction limited Gaussian beam, typically $M^2 < 1.3$. The output beam would be spectrally pure, that is residual fundamental and second harmonic light would be <1% of the third harmonic power. The system would convert fundamental radiation to third harmonic with an efficiency greater than about 30%, preferably greater than about 40%. The optical layout for third harmonic generation would also be easily optimized and contain relatively simple optical components. The system would flexibly operate over a wide operating range of pulse repetition frequencies and pulse widths.

It would also be desirable for the third harmonic output to be high power, with at least moderate energy pulses to efficiently process high volumes of material. For example, average power would be greater than 1 W, and preferably greater than 10 W with the potential to scale to higher power. The pulse energy would be greater than about 1 microjoule ($\mu$J), preferably greater than 10 $\mu$J with potential to scale to higher pulse energies.

Presently, there is no existing solution that would fulfill all these commercial requirements forcing customers make compromises and limiting the application of third harmonic systems.

Much of the prior art on third harmonic generation deals with intra-cavity systems. In an intra-cavity system, the third harmonic generation takes place within a resonator cavity defined by two reflective surfaces. An optical gain medium for the laser system is located within the cavity along with one or more non-linear optical crystals. The optical gain medium produces the fundamental radiation that undergoes frequency conversion in the non-linear optical crystals.

U.S. Pat. No. 5,850,407 to William Grossman discloses a type-I second harmonic generation (SHG) crystal followed by type-II third harmonic generation (THG) crystal within a laser cavity. This reference describes intracavity generation of third harmonic using a Lithium Borate (LBO) nonlinear crystal fabricated so that the output face is exactly at Brewster angle with respect to the fundamental and third harmonic beam. In this system, the output face must be at Brewster angle for the fundamental beam since otherwise the fundamental cavity would encounter additional losses. The Brewster surface provides three functions. First, it provides for wavelength separation of fundamental, second harmonic, and third harmonic beams from dispersion on the angled interface. Second, it provides for near-zero loss for IR and UV light. Third it is a high damage-threshold surface. Unfortunately, system in U.S. Pat. No. 5,850,407 requires an elliptical input beam and does not provide high single-pass conversion efficiency. Low single-pass conversion efficiency is not a problem in Q-switched intracavity harmonic generation since the fundamental beam is recirculated in the resonator cavity. Furthermore, since it only works efficiently intracavity, the system is not flexible since Q-switched lasers only operate over a narrow range of operating parameters.

It is noted that for a very large & round input fundamental beam, and in the low-efficiency limit, a Brewster-Brewster design (i.e., one in which both the input and output faces of non-linear crystal are Brewster angle faces) generates a round UV beam. This is essentially the operating point for the system described in the U.S. Pat. No. 5,850,407 patent. While a Brewster-Brewster design is useful in intra-cavity tripled systems, the single pass conversion efficiency is too low for extra-cavity harmonic generation.

Another example is described in U.S. Pat. No. 7,016,389. This patent discusses fabricating a wedge on the exit surface of the third harmonic crystal, which is generally smaller than the Brewster angle. Again this design is for an intracavity harmonic generation system. Extra-cavity designs require tighter focusing of the input beam in the nonlinear crystals than intracavity designs for efficient harmonic generation.

U.S. Pat. No. 7,170,911 describes an extra-cavity third harmonic nonlinear crystal fabricated with a Brewster angled output face. Alternatively such a system may be fabricated with coatings suitable to reduce reflections at normal or near-normal incidence output face. However, it is undesirable to put such coatings on a surface that receives a significant flux of ultraviolet radiation.

It is within this context that embodiments of the present invention arise.

SUMMARY

Aspects of the present disclosure are directed to apparatus that can efficiently produce a round, non-astigmatic, third harmonic output beam with a single-pass, extra-cavity optical layout using an oblique angle of incidence on the nonlinear crystal output face.

An extra cavity harmonic generator system may be configured to produce a round, non-astigmatic third harmonic output beam from a nominally round, non-astigmatic, diffraction limited input fundamental beam. The system may comprise a second harmonic generator (SHG) crystal and a third harmonic generator (THG) crystal. The SHG crystal is configured to generate a second harmonic beam from the input fundamental beam. The THG crystal is configured to generate a third harmonic beam from the second harmonic beam and a residual fundamental beam from the SHG crystal. The SHG crystal has an input face oriented at an angle of incidence with respect to the input fundamental beam. The fundamental beam size is expanded in a non-walkoff direction for the SHG crystal at the input face. The THG crystal has an output face oriented at an oblique angle of incidence in a non-walkoff direction for the THG crystal such that the third harmonic beam size is contracted in this direction. Expansion of the input fundamental beam at the input face of the SHG crystal exceeds a reduction of a third harmonic beam at the output face of the THG crystal.

This concept may be extended to harmonic generator systems involving generation of higher order harmonic radiation, e.g., fourth harmonic or higher.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
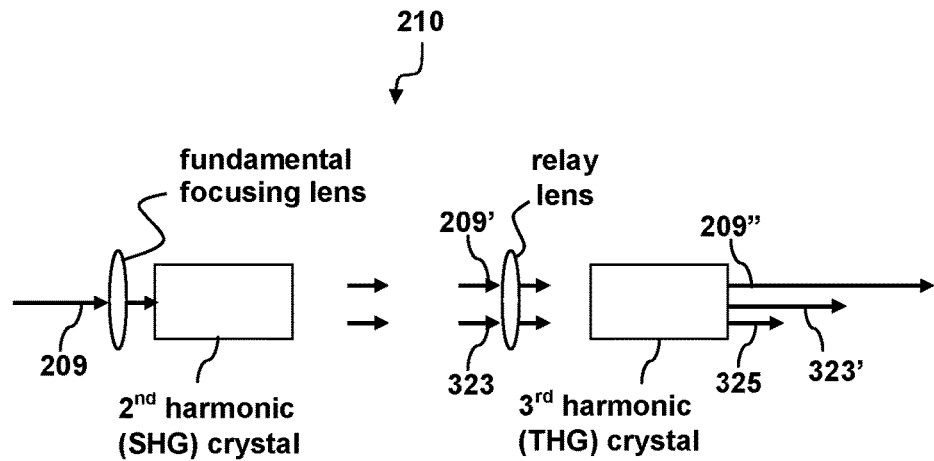
FIG. 1 is a schematic diagram depicting a basic prior art optical layout for third harmonic generation.

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Additionally, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of about 1 nm to about 200 nm should be interpreted to include not only the explicitly recited limits of about 1 nm and about 200 nm, but also to include individual sizes such as but not limited to 2 nm, 3 nm, 4 nm, and sub-ranges such as 10 nm to 50 nm, 20 nm to 100 nm, etc.

Glossary:

As used herein:

Astigmatism refers to an optical aberration in which rays that propagate through an optical system in two perpendicular planes have different foci. An astigmatic beam comes to a waist in the x-direction in a different location than the waist in the y-direction. (The term "waist" is defined below.) If a light beam has its x-waist radius $w_{0x}$ at location $Z_x$, and y-waist radius $w_{0y}$ at location $Z_y$, then the astigmatism A is defined as the difference between the waist locations, divided by the average Rayleigh range of the waists:

$$A = \frac{Z_x - Z_y}{Z_R}$$

where $\bar{Z}_R$ is the average Rayleigh range:

$$\bar{Z}_R = \frac{1}{2}\left\{\frac{\pi w_{0x}^2}{\lambda} + \frac{\pi w_{0y}^2}{\lambda}\right\}.$$

Beam splitter refers to an optical device capable of splitting a beam of light into two or more parts.

Cavity or Optically Resonant Cavity refers to an optical path defined by two or more reflecting surfaces along which light can reciprocate or circulate. Objects that intersect the optical path are said to be within the cavity.

Continuous wave (CW) laser refers to a laser that emits radiation continuously rather than in short bursts, as in a pulsed laser.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through an amplifier. The term "unsaturated gain" refers to the increase of a small signal passing through the amplifier, which does not significantly change the inversion level in the amplifier. As used herein gain and unsaturated gain will be used interchangeably.

Gain Medium refers to a material capable of generating optical gain as described below with respect to a Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and similar.

Infrared Radiation refers to electromagnetic radiation characterized by a vacuum wavelength between about 700 nanometers (nm) and about 100,000 nm.

Laser is an acronym of light amplification by stimulated emission of radiation. A laser is a cavity that is contains a lasable material. This is any material—crystal, glass, liquid, semiconductor, dye or gas—the atoms of which are capable of being excited to a metastable state by pumping e.g., by light or an electric discharge. Light is emitted from the metastable state by the material as it drops back to the ground state. The light emission is stimulated by the presence by a passing photon, which causes the emitted photon to have the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

$M^2$ is a measure of beam quality. Every beam of light has an associated $M^2$ that can be calculated from its waist radius $w_0$, its divergence half-angle $\theta$, and its wavelength $\lambda$. The value of $M^2$ is:

$$M^2 = \frac{\pi w_0 \theta}{\lambda}$$

A beam that has only one transverse mode—i.e. that is perfectly Gaussian—has $M^2=1$. Multi-mode beams have $M^2>1$. For a beam to be acceptably close to a pure Gaussian beam, typically one requires that $M^2<1.3$.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since the two values are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Examples of non-linear crystals include, but are not limited to, lithium niobate ($LiNbO_3$), lithium triborate (LBO), beta-barium borate (BBO), cesium lithium borate (CLBO), lithium tantalite, stoichiometric lithium tantalite (SLT) potassium titanyl phosphate ($KTiOPO_4$ also known as KTP), ammonium dihydrogen arsenate (ADA), ammonium dihydrogen phosphate (ADP), cesium triborate ($CsB_3O_5$ or CBO), deuterated ammonium dihydrogen arsenate (DADA), deuterated ammonium dihydrogen phosphate (DADP), deuterated arginine phosphate (DLAP), rubidium di-deuterium phosphate ($RbD_2PO_4$ or DRDP, potassium aluminum borate (KABO), potassium dihydrogen arsenate (KDA), potassium dihydrogen phosphate (KDP), deuterated potassium dihydrogen phosphate ($KD_2PO_4$ or DKDP), $L_i2B_4O_7$ (LB4), or lithium formate monohydrate (LFM) and isomorphs thereof, periodically poled materials such as periodically poled lithium niobate (PPLN), periodically poled lithium tantalite and periodically poled stoichiometric lithium tantalite (PPSLT), and the like. Optical fiber can also be induced to have a non-linear response to optical radiation by fabricating microstructures in the fiber.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multi-wave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Energy refers to the amount of energy in a pulse. Pulse energy may be calculated by integrating instantaneous pulse power over the pulse period.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as $(2\pi)\times$(average energy stored in the resonator)/(energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with acousto-optic or electro-optic modulators or saturable absorbers, a giant pulse is generated.

Quasi-CW refers to generating a succession of pulses at a high enough repetition rate to appear continuous.

Quasi Phase-matched (QPM) Material: In a quasi-phase-matched material, the fundamental and higher harmonic radiation are phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Waist: As usual in Gaussian optics, the waist w of a beam refers to the radius of that beam at its smallest point; i.e., at the focus. The radius of a beam is defined as the distance between the center of the beam and the point where the intensity falls to $1/e^2$ of the value at the center. When the beam is not round, one generally speaks of two waists, or waist radii, $w_x$ and $w_y$, obtained by fitting the beam to an elliptical Gaussian and extracting the $1/e^2$ distances along the major and minor axes. The diameter, or width, of a beam along a certain direction (say, along the x-axis) is twice the value of the waist: diameter=2 w.

Introduction

FIG. 1 shows a schematic of a typical optical set up used for third harmonic generation. A fundamental beam 209 passes through and is focused by a fundamental focusing lens 203. A second harmonic (SH) crystal 202 is placed at or in the vicinity of the fundamental beam focus. The SH crystal 202 converts some fraction of the incident fundamental beam to the second harmonic. For example if the fundamental beam is at 1064 nm a properly fabricated and oriented second harmonic crystal may be LBO. The resultant second harmonic would have a wavelength of 532 nm. A residual fundamental beam 209' and a second harmonic 323 beam emerge from the output face 206 of the SH crystal 202. The emerging fundamental beam 209' has a lower power than the incident fundamental beam 209, since some of its power has been converted to the second harmonic beam 323. The second harmonic beam 323 has a frequency equal to twice the optical frequency of the fundamental beam 209'. It may be stated equivalently that second harmonic beam has a vacuum wavelength that is half the vacuum wavelength of the fundamental beam 209'. Both beams pass through and are focused by a relay lens 205.

A third harmonic (TH) crystal 302 is placed at or in the vicinity of the fundamental and second harmonic beam focus. The beams overlap, at least partially, in the TH crystal 302. The TH crystal converts 302 the mixture of the fundamental beam 209' and second harmonic beam 323 to a third harmonic beam 325. The third harmonic beam 325 has an optical frequency equal to a sum of the frequency of the fundamental beam and the frequency of the second harmonic beam 323. For example if the fundamental beam is at a vacuum wavelength of 1064 nm and the second harmonic beam is at a vacuum wavelength of 532 nm a properly fabricated and oriented third harmonic crystal may be LBO. The resultant third harmonic beam 325 would have a vacuum wavelength of 355 nm Three different wavelength beams, the fundamental 209", the remaining second harmonic 323', and the third harmonic 325 emerge from the output face 306 of the TH crystal 302. For clarity in FIG. 1 the beams are shown as spatially displaced lines, but in practice the beams have a finite spatial extent and may be spatially overlapped.

While FIG. 1 displays a basic third harmonic generation system many possible variations exists. For example, the SH and TH crystals may be fabricated as parallelepipeds or prisms. In addition, the beams may be incident on the entrance and exit crystal surfaces at oblique angles. Alternative types of focusing elements, for example curved mirrors may be used in place of lenses to focus the beams.

Many factors impact the third harmonic beam shape and conversion efficiency. These factors include, but are not limited to:

i) Fundamental beam transverse modal properties
ii) Fundamental beam peak power
iii) Fundamental beam spectral width
iv) Focusing conditions into the SHG crystal v) Focusing conditions into the THG crystal
vi) Input and output angles of the SHG crystal
vii) Input and output angle of the THG crystal
viii) Length of the SHG crystal
ix) Length of the THG crystal
x) Poynting vector walkoff in the SHG
xi) Poynting vector walkoff in the THG In general there is a tradeoff between efficient conversion efficiency and generating a round third harmonic beam. Efficient conversion requires high beam intensities mandating a tight beam focus and long SHG and THG crystals. The tight focus and long crystals exacerbate the effects of Poynting vector walkoff, elongating and deforming the beams in the walkoff direction. Also at conversion efficiencies above approximately 30% pump depletion may distort the beam shape and limit the conversion efficiency.

Regions of high intensity convert a greater fraction of the power into harmonics than regions of low intensity. Furthermore the tight focus in the crystals produces high intensities at the crystal faces, which increases the likelihood of catastrophic optical damage at these surfaces. This is particularly a problem on the output face of the THG crystal since this surface is exposed to a high intensity third harmonic beam.

The present disclosure describes an innovative optical harmonic generator system that simultaneously produces high single-pass conversion efficiency and a round, near-diffraction limited output beam over a wide range of operating conditions with a minimum of optical components.

Aspects of the present disclosure are particularly suited for use with a seeded, fiber amplifier source as described in U.S. Pat. No. 7,443,903, U.S. Pat. No. 7,529,281, U.S. Pat. No. 7,469,081, and U.S. Pat. No. 8,009,705, all of which are incorporated herein by reference.

Optical Harmonic Generator

Figure 2A:
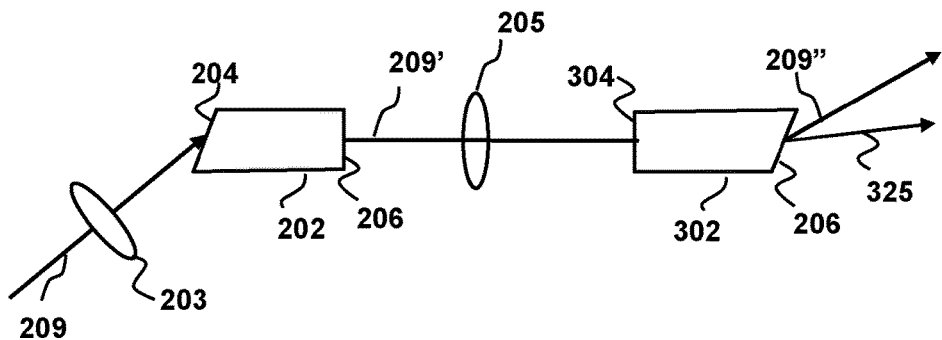
FIG. 2A is a schematic diagram of an optical layout for third harmonic generation in accordance with aspects of the present disclosure.

FIG. 2A schematically illustrates the lay of an optical harmonic generator 200 in accordance with aspects of the present disclosure. A focusing lens focuses the input fundamental radiation into an input fundamental beam 209 that is round, near diffraction limited, with $M^2<1.2$ and minimal astigmatism. For example, the astigmatism may be less than 10%.

The input fundamental beam 209 is focused on to an SHG crystal 202 by fundamental focusing lens 203. The SHG crystal 202 is fabricated and oriented for phasematching the fundamental to the second harmonic of the fundamental radiation. An input face 204 of the SHG crystal 202 is oriented so that the input fundamental beam 209 is incident on this face at an oblique angle of incidence $\theta_i$ so as to expand the beam size in one axis. The ratio of expansion (R) is given by the expression $R=\cos\theta_i/\cos\theta_t$, where $\theta_t$ refers to the transmitted angle. As is conventional, these angles are measured with respect to a direction normal (i.e., perpendicular) to the input face 204 of the SHG crystal 202. These angles are related by Snell's law as $n_i \sin\theta_i = n_t \sin\theta_t$, wherein $n_i$ is the refractive index of the incident medium (e.g., $n_i$ is equal to 1 for vacuum and approximately equal to 1 for air) and $n_t$ is the refractive index for the SHG crystal 202.

Figure 3:
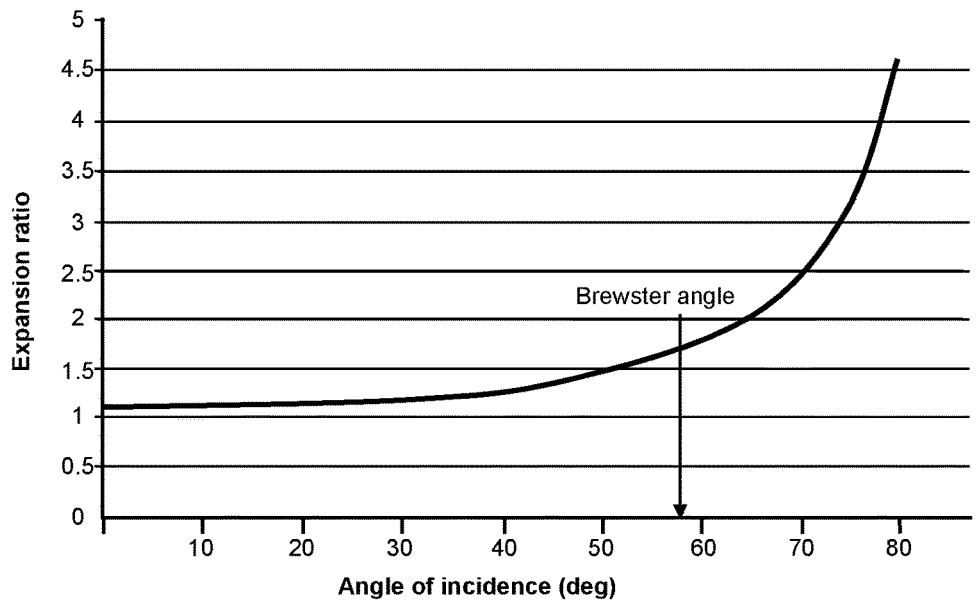
FIG. 3 is a graph of expansion ratio as a function of angle of incidence for a material with a refractive index of 1.6 (typical of LBO).

The graph shown in FIG. 3 plots the expansion ratio R as a function of the angle of incidence $\theta_i$ for a material with a refractive index $n_t$ of 1.6, which is approximately the refractive index for LBO. The angle of incidence $\theta_i$ may be chosen so that it is at or near Brewster angle $\theta_B=\arctan(n_t/n_i)$. By way of example, and not by way of limitation, the input face of the SHG crystal is oriented such that it is within about 5 degrees of the Brewster angle with respect to the input fundamental beam 209, (i.e., $\theta_i$ is within about 5 degrees of the Brewster angle for the SHG crystal). As is well known to those of skill in the art, when light is incident on an interface at Brewster's angle $\theta_i$ light reflected from the interface is s polarized (i.e., polarized in a direction perpendicular to the plane of incidence). This minimizes reflection losses for "p" polarized incident light (i.e., light polarized parallel to the plane of incidence) for an uncoated surface as shown in the graph depicted in FIG. 4. If angle of incidence $\theta_i$ is chosen as Brewster's angle then the expansion ratio R is simply the SHG crystal refractive index, e.g., approximately 1.6 for LBO.

The orientation of the input face 204 of the SHG crystal 202 is chosen such that the direction of the expansion of the beam at the input face 202 is oriented along a non-walkoff direction in the SHG crystal 202.

The astigmatism introduced in the fundamental beam by the asymmetric beam expansion may be easily controlled by the positioning of the SHG crystal 202 relative to the fundamental beam focus. For example, if the input face 204 is placed exactly at the waist, the expansion introduces no astigmatism. Alternatively, if the waist is shifted into the SHG crystal 202 the introduced astigmatism will increase monotonically with the waist in the expanded direction located farther from the input face than the waist in the unexpanded direction. Placing the waist before the SHG crystal 202 will introduce astigmatism with the opposite sense, i.e., the introduced astigmatism will increase monotonically with the waist in the unexpanded direction located farther from the input face than the waist in the expanded direction.

An important point is that the fundamental beam astigmatism may be readily controlled by the simple adjustment of the location of the fundamental beam waist with respect to the SHG crystal input face 204. The adjustment of the beam waist has little impact on the expansion ratio. The expansion ratio is primarily controlled by the angle of incidence $\theta_i$ of the input fundamental beam 209 on the SHG crystal input face 204. This angle can be controlled by crystal fabrication. By way of example, the angle may be controlled so that the typical beam waist size in the SHG crystal may be about 60 microns in the tight focus direction and about 100 microns in the walkoff direction. Typical expansion ratios are in the range from 1.5:1 to 2.5:1.

The residual fundamental beam 209' and the second harmonic beam (not shown) leave the SHG crystal 202 at an output face 206. This face may be fabricated and aligned for nominal normal incidence. The exact angle of incidence is not important. The output face 206 may be oriented so that the beams are incident at an angle that may be several degrees off normal to reduce impact of back reflections. The output face 206 of the SHG crystal 202 may also be antireflection coated to reduce back reflections and maximize the output power. The coating may advantageously have low reflectance at both the emerging fundamental 209' and the second harmonic beam.

The fundamental and second harmonic beams then pass through and may be focused by the relay lens 205 or some other optical focusing element (e.g., a focusing mirror). The focusing system may be advantageously designed so that beam waist profiles in second harmonic crystal are replicated, with some defined magnification, in the third harmonic generation (THG) crystal 302. There are at least two possible methods to achieve this. One method uses a single relay lens 205 positioned such that it is in the far-field of the beam emerging from the second harmonic crystal. Far-field implies that distance is greater than about five times the Rayleigh length corresponding to the largest waist in the second harmonic crystal. For example if the largest fundamental beam waist size in the second harmonic crystal is 120 microns and the wavelength is 1064 nm, then the Rayleigh length is approximately 42.6 mm. Thus the waist to relay lens separation should be greater than approximately 200 mm. The magnification will be approximately the ratio of the distances on both sides of the lens given by $14=1/d_1+1/d_2$, where f is the lens focal length, $d_1$ is the distance between the lens and waist in or near the second harmonic crystal, and $d_2$ is the distance between the lens and waist in or near the third harmonic crystal.

Figure 2B:
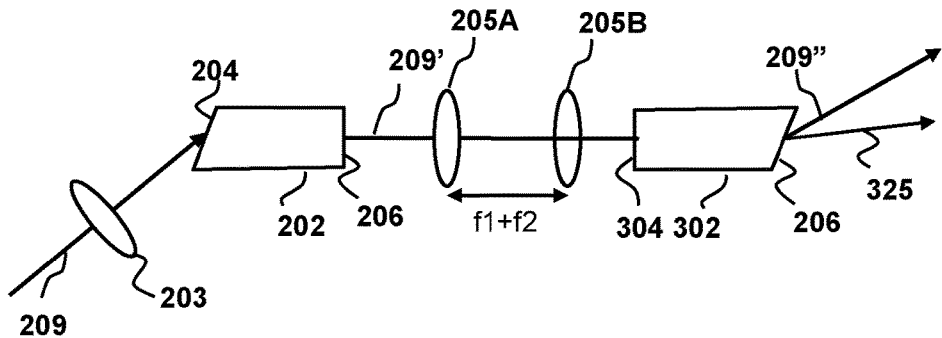
FIG. 2B is a schematic diagram of an alternative optical layout for third harmonic generation in accordance with aspects of the present disclosure.

The second method, shown in FIG. 2B uses first and second lenses, 205A, 205B, of focal length, $f_1$ and $f_2$, respectively. The first lens 205A is positioned a distance approximately f from the waist in the second harmonic crystal. The second lens 205B is positioned a distance approximately $f_1+f_2$ from the first lens 205A. The waist produced by the second lens 205B will be a distance $f_2$ from lens 2. The magnification will be approximately the ratio of $f_2/f_1$. Some implementations may completely omit relay lenses between the SHG crystal 202 and the THG crystal 302 if the SHG crystal output face 206 is sufficiently close to the THG crystal input face 304.

The focus of the second harmonic beam and the residual fundamental beam 209' is in or near the THG crystal 302. The front face 304 of the THG crystal 302 may be fabricated and aligned for nominal normal incidence. Again, the exact angle of incidence is not important. Furthermore the THG crystal 302 may be configured so that the beams may be several degrees off normal to reduce the impact of back reflections. The front face of the THG crystal 302 may be antireflection coated to reduce back reflections and to maximize the output power. Such a coating may advantageously have low reflectance at both the fundamental and the second harmonic wavelengths. The size of the focused fundamental spot is similar to the size of the focused fundamental spot in the SHG crystal 202.

The THG crystal 302 is fabricated and oriented for phasematching the fundamental and second harmonic beams for third harmonic generation. The THG crystal 302 may also be oriented so that fundamental and second harmonic beams "walk-on" each other as they traverse the crystal as described by in U.S. Pat. No. 5,835,513 to Pieterse. This maximizes overlap of the fundamental and second harmonic beams in the THG crystal 302 and thus maximizes the conversion efficiency.

The output face 306 of the THG crystal 302 is fabricated such that the beams 209", 325 are incident at an oblique angle of incidence. The angle of incidence may be chosen using the following five criteria:

(i) Reflection of the third harmonic is suitably low, e.g., less than 5%
(ii) Angular beam separation due to dispersion is sufficient such that third harmonic may be spatially filtered from fundamental and second harmonic beam. By way of example, and not by way of limitation, a typical criterion for filtering may be that the angular separation between the beams is at least twice the beam divergence.
(iii) The contraction the third harmonic beam experiences passing through the output face may create approximately equal waist sizes in the walkoff and non-walkoff directions.
(iv) The astigmatism introduced by the output face may be chosen to approximately cancel any previous beam astigmatism, such that the apparent waist positions of the exiting third harmonic beam are approximately equal in the walkoff and non-walkoff directions.
(v) The output face is preferably robust against optical damage and yield long lived operation.

Figure 5:
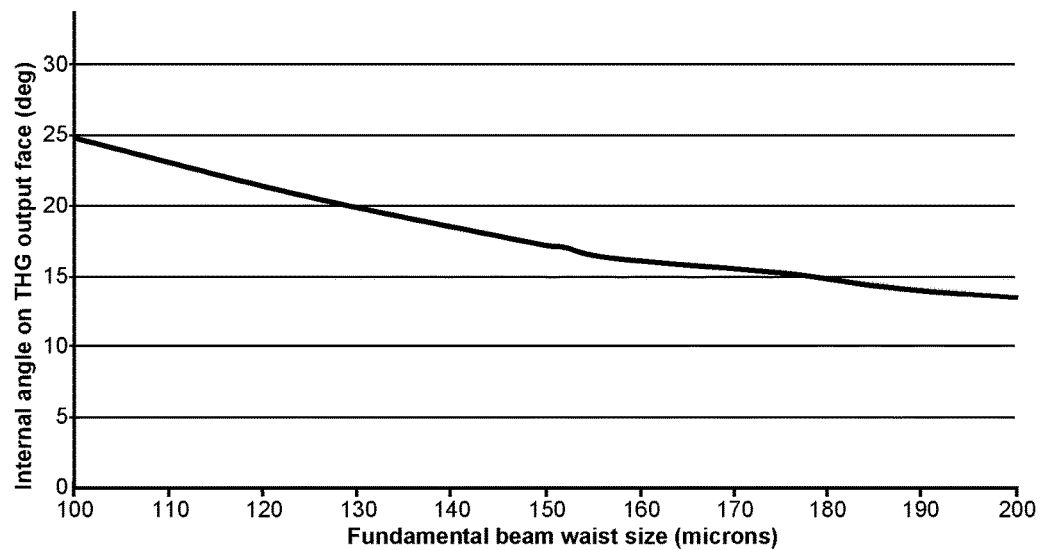
FIG. 5 is a graph of minimum internal angle on the THG crystal output face to provide angular separation between the fundamental, second harmonic, and third harmonic greater than the beam divergence.

By way of example, and not by way of limitation, for a third harmonic generator optical layout using a LBO SHG crystal with an approximately Brewster angle input and a LBO THG crystal, the output face may be oriented such that the third harmonic beam angle of incidence is 20° satisfies the above five criteria. Specifically, for low reflection loss, the third harmonic beam may exit the crystal at an angle of transmission of approximately 33°. For an uncoated output face this gives an acceptable third harmonic reflectance of 3.1%. Sufficient angular separate may be achieved for an input fundamental wavelength of 1064.2 nm and an LBO temperature of 35° C.; the refractive indices of the fundamental, second harmonic, and third harmonic beams are approximately 1.565, 1.613, and 1.597, respectively. Dispersion on the THG crystal output face may advantageously spatially separate the beams due to the difference in the transmitted angle for the different wavelengths. FIG. 5 plots the internal angle of incidence on the THG crystal output face versus the fundamental beam waist size in the THG crystal which results in the third harmonic beam separation from the second harmonic beam being at least equal to the half divergence of the two beams.

The third harmonic beam 325 emerging from the THG crystal 302 may have an optical power of greater than about 1 Watt, greater than about 10 Watts or greater than about 30 Watts.

To make the output face of the THG crystal 302 robust against optical damage the output face of the THG crystal may be uncoated. As described in U.S. Pat. No. 5,850,407 by William Grossman use of an uncoated output face provides a high damage threshold.

In summary a round, non-astigmatic, near diffraction limited third harmonic beam may be efficiently generated from a round non-astigmatic, near diffraction limited fundamental beam using an optical layout having the following:
  i) a lens or other optical component that focuses the fundamental input beam into the SHG crystal;
  ii) a Brewster or near-Brewster angled SHG input face;
  iii) a Relay lens (or other optical component) between the SHG and THG crystals.
  iv) Near 20° incidence of the SH and residual fundament beams at the THG output face The foregoing optical layout has the following advantages.
(1) It allows small beam sizes in nonlinear crystals to provide optimal efficiency.
(2) It does not require special lenses or prisms for walkoff compensation.
(3) It provides an adjustment "knob" for astigmatism by adjusting position of first fundamental beam waist with respect to SHG crystal input face
(4) It provides an adjustment "knob" for roundness by adjusting relay lens and THG crystal locations.

Figure 4:
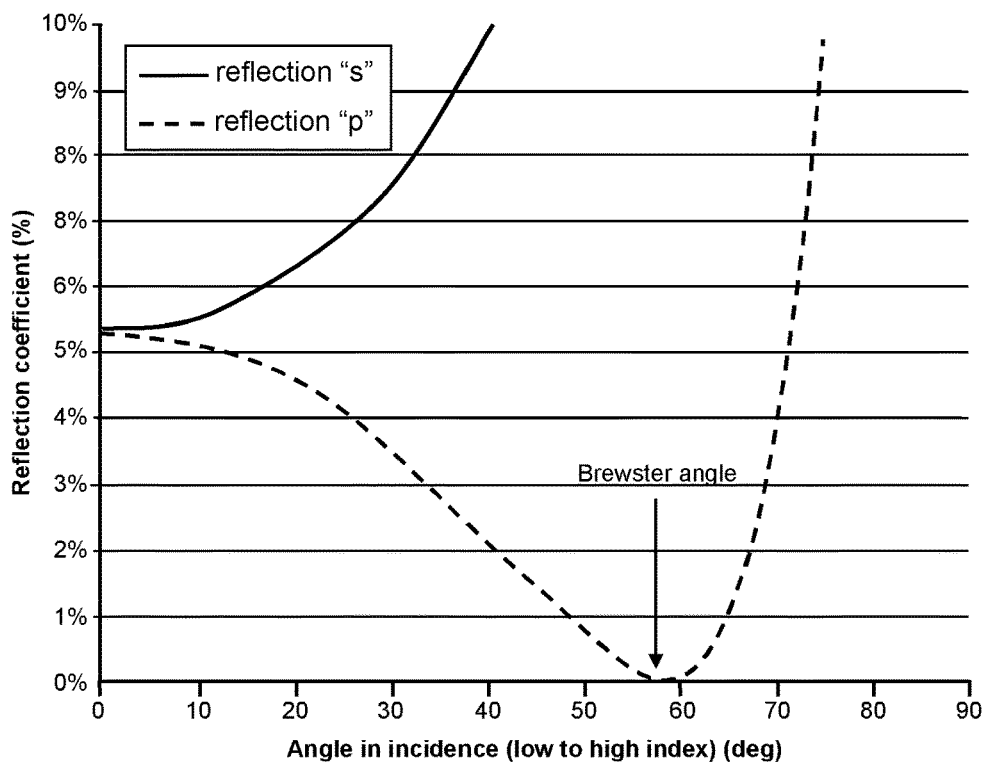
FIG. 4 is a graph of reflection loss for "p" and "s" polarization as a function of angle of incidence for an uncoated surface with an initial refractive index of 1 (air) and a final refractive index of 1.6 (typical of LBO).

In general, the SHG input face 204 may be at approximately Brewster angle or sufficiently close to Brewster angle so that the power loss is acceptable. For example, as may be seen from FIG. 4, the reflection loss for p-polarized light at the SHG 204 input face can be kept to about 2% or less if the angle of incidence at the SHG input face is between roughly $\theta_B-20°$ and $\theta_B+10°$. FIG. 4 can also be used to estimate the reflection loss at the THG output face 306. In such a case, the relevant angle would be the angle of refraction at the THG output face, i.e., the angle between the THG output beam 325 and the normal to the THG output face 306.

Figure 7:
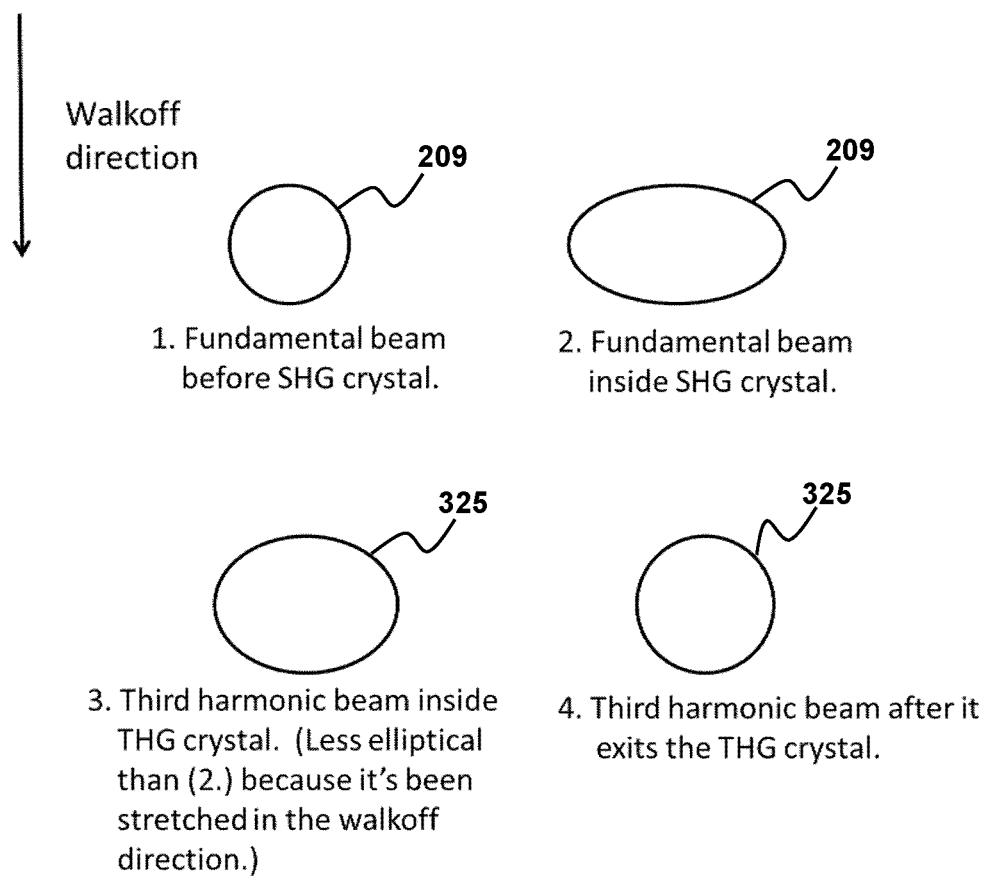
FIG. 7 is a schematic diagram illustrating cross-sectional beam shapes at different places in a third harmonic generation system according to aspects of the present disclosure.

To assist in understanding certain aspects of the present disclosure, four diagrams shown in FIG. 7 illustrate the change in shape of the beam at various locations in the optical harmonic generator 200. In particular, in diagram 1, the fundamental beam 209 starts off round. Then in diagram 2 the fundamental beam is expanded in the non-walkoff direction at the input face 204 of the SHG crystal 202. The expansion results in an elliptical beam cross-section that is oriented perpendicular to the walkoff direction in the SHG crystal 202. The THG crystal 302 generates the third harmonic beam 325 with the shape shown in diagram 3. This shape is not as elliptical as the fundamental beam was in diagram 2, because it has been stretched in the walkoff direction. The third harmonic beam 325 then needs to be compressed in the non-walkoff direction, as shown in diagram 4, to get a round beam. The compression can take place at the output face of the THG crystal as discussed above. The reduction should be less than the expansion of the fundamental beam was, because the third harmonic beam 325 is less elliptical than the fundamental beam 209 was. Consequently, the expansion at the input face of the SHG crystal exceeds the subsequent reduction at the output face of the THG crystal 302.

Alternative Embodiments

A first alternative embodiment is to increase the angle of incidence on the SHG crystal 202 so that it is greater than Brewster angle. The input surface 204 of the SHG 202 may be coated to reduce any back reflections and improve efficiency. A round, non-astigmatic, near diffraction limited third harmonic may be obtained by using a THG crystal 302 fabricated so that its output face is oriented at or near Brewster angle.

In one alternative embodiment, a pair of prisms may be positioned anywhere in the beam prior to the SHG crystal 302 and their fabrication angles and alignment may be chosen to give the desired ellipticity and astigmatism in the SHG crystal 202.

Another alternative embodiment is to use the optical design described herein for higher harmonic generation (HHG) other than third harmonic generation. For example 4th harmonic versions may be implemented. One version of such an embodiment, may use two nonlinear crystals. A first nonlinear crystal converts fundamental radiation to the second harmonic and a second nonlinear crystal converts the second harmonic to the fourth harmonic. For a fundamental wavelength at or near 1064 nm a LBO crystal may be used for the SHG crystal and a barium borate (BBO) crystal may be used for the FHG crystal.

A second version may use three nonlinear crystals to convert fundamental radiation to fourth harmonic radiation. Specifically, a first crystal may be used to convert some of the fundamental radiation to the second harmonic. A second crystal mixes the second harmonic with the residual fundamental to generate a third harmonic. A third crystal mixes the third harmonic with the residual fundamental to generate a fourth harmonic. For a fundamental wavelength at or near 1064 nm appropriately oriented LBO crystals may be used in all harmonic conversion stages.

In either the first or second version, all surfaces which transmit third or fourth harmonic beams may be uncoated and oriented at either Brewster angle or less-than Brewster angle for the harmonic beam.

Aspects of the present disclosure provide for simple adjustment of beam shape using a single cylindrical lens and the principles of Gaussian optics. The lens can be placed close to a nonlinear crystal thereby overcoming pre-existing space constraints in certain optical systems without having to re-design major hardware components.

Advantages of the proposed system include high conversion efficiency to the third harmonic and a round output beam. Such a system can work with both LBO and BBO nonlinear crystals. The system is characterized by a high damage threshold for third harmonic crystal. In addition, the system utilizes no UV beam shaping optics and no coatings on any surface transmitting UV leading to high reliability and long lived system.

The third harmonic beam is easily separated from the fundamental and second harmonic beams by dispersion at the third harmonic generator crystal output face. This system can provide design-adjustable beam roundness and alignment-adjustable astigmatism. The system requires minimal optical components and minimal or no cylindrical optics or prisms.

Laser System

Figure 6:
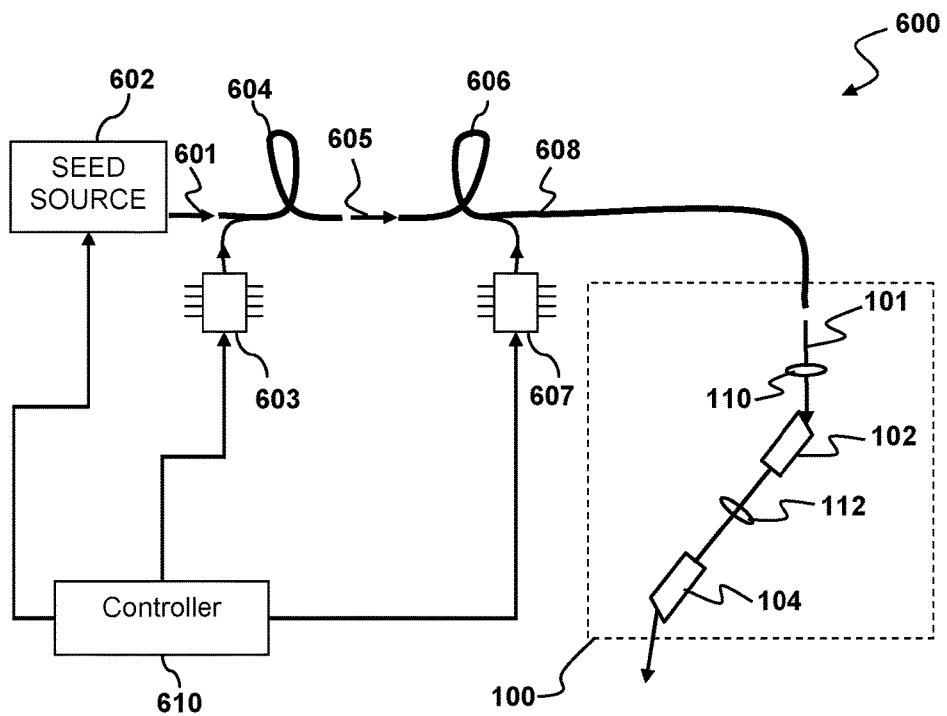
FIG. 6 is a schematic diagram of a wavelength converted laser system according to an aspect of the present disclosure.

FIG. 6 depicts an example of a wavelength-converted laser system 600 according to an embodiment of the present invention. Specifically, the system 600 generally includes a seed source 602, one or more optical amplifiers 604, 606, and a wavelength converter 100, which may be configured as described herein with respect to FIG. 2A, FIG. 2B, or any of the other configurations described above. The seed source 602 generates seed radiation 601, which is amplified by the optical amplifiers 604, 606 to produce an amplified output that serves as fundamental input radiation 101 for the wavelength converter. The wavelength converter 100 wavelength converts at least a portion of the amplified output to produce a wavelength converted output. A portion of the fundamental input beam may also emerge from the wavelength converter 100.

There are a number of different possible designs for the seed source 602. For example, the seed source 602 may be a diode laser pumped by driving electric current through the diode. Various types of laser diodes, such as a distributed Bragg reflector (DBR) laser, distributed feedback (DFB), or Fabry-Perot laser diode may be used. An example of a commercially available DBR is a model DBR-1064-100 from Sacher Lasertechnik Group of Marburg, Germany. Alternatively, the seed source 602 may be a diode-pumped solid state (DPSS) laser, which may be passively Q-switched, mode-locked or run continuous wave (CW) or quasi-CW. Other types of lasers may alternatively be used as the seed source 602.

The optical amplifiers may include one or more amplifier units 604, 606. For example, an optional pre-amplifier 604 can be optically coupled in series between the seed source 602 and a power amplifier 606. The pre-amplifier 604 may amplify the seed radiation 602 thereby producing an intermediate signal 605, which is amplified by the power amplifier 606 to produce the amplified output that forms the fundamental input beam 101. The amplifiers 604, 606 are optically coupled to an output fiber 608. The fundamental input beam 101 emerges from an end face of the fiber 608.

By way of example, one or more of the amplifiers 604, 606 may be fiber amplifiers that include optical fibers coupled to pumping sources 603, 607. The optical fibers may generally include a cladding and a doped core. The core of the fiber may be, e.g., about 6 microns in diameter. The fiber may be a polarization maintaining or single polarization fiber. A portion of one of the amplifiers 606 may form the output fiber 608. Input radiation that is to be amplified (e.g., seed radiation 601 or intermediate radiation 605) is coupled to the core. Pumping radiation from the pumping sources 603, 607 (e.g., diode lasers) is also typically coupled to the core, but may alternatively be coupled to the cladding. Dopant atoms, e.g., rare earth elements such as ytterbium (Yb), erbium (Er), neodymium (Nd), holmium (Ho) samarium (Sm) and thulium (Tm), or combinations of two or more of these, in the core of the fiber absorb energy from the pumping radiation. The absorbed energy amplifies the energy of the input radiation in the core of the fiber. The input radiation stimulates emission of radiation from the dopant atoms. The stimulated radiation has the same frequency and phase as the input radiation. The result is an amplified output having the same frequency and phase as the input radiation but a greater optical intensity.

A controller 610 may be operably coupled to the seed source 602 and/or pump sources 603, 607. The controller 610 may implement hardware or software logic adapted to control the power of the seed radiation 601 or pump radiation provided by the pump sources 603, 607. By controlling the power of the seed radiation 601 from the seed source and/or the pump radiation from the pump sources 603 and 607, the controller 610 controls the optical power of the input beam 101 provided to the wavelength converter 100.

The wavelength converter 100 may include first and second non-linear optical crystals 102, 104, and lenses 110, 112, which may be configured as described above. By way of example, and not by way of limitation, the first non-linear crystal 102 may be a SHG crystal that produces a second harmonic beam output from a non-linear interaction between the crystal 102 and the input fundamental radiation 101.

The THG crystal produces third harmonic radiation through a sum-frequency interaction between the SHG output beam from the SHG crystal 102 and a residual fundamental beam from the SHG crystal. The third harmonic radiation emerges from the THG crystal as the wavelength converted output 111. Some leftover input radiation 101' may also emerge from the second crystal 104. The THG crystal may include a Brewster-cut end face 106 that separates the wavelength converted output 111 from residual fundamental radiation that emerges from the second crystal.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A laser system comprising:
   a seed source configured to produce seed radiation used to form a nominally round, non-astigmatic, diffraction limited input fundamental beam; and
   an extra cavity harmonic generator system configured to produce a round, non-astigmatic, third harmonic output beam from a nominally round, non-astigmatic, diffraction limited input fundamental beam, the system comprising:
   a second harmonic generation (SHG) crystal having an input face oriented at an angle of incidence with respect to the input fundamental beam wherein the fundamental beam size is expanded in a non-walkoff direction for the SHG crystal at the input face, the SHG crystal being configured to generate a second harmonic beam from the input fundamental beam;
   a third harmonic generation (THG) crystal having an output face oriented at an oblique angle of incidence in a non-walkoff direction for the THG crystal such that the third harmonic beam size is contracted in this direction, the THG crystal being configured to generate a third harmonic beam from the second harmonic beam and a residual fundamental beam from the SHG crystal;
   wherein an expansion of the input fundamental beam at the input face of the SHG crystal exceeds a reduction of a third harmonic beam at the output face of the THG crystal.

2. The system of claim 1, further comprising a controller operably coupled to the seed source.

3. The system of claim 2, wherein the controller is configured to implement hardware or software logic adapted to control a power of the seed radiation provided by the seed source.

4. The system of claim 1, further comprising one or more optical amplifiers optically coupled to the seed source and configured to amplify the seed radiation to generate amplified radiation that serves as input radiation for the input fundamental beam.

5. The system of claim 4, wherein the one or more optical amplifiers include a pre-amplifier optically coupled in series between the seed source and a power amplifier.

6. The system of claim 4, wherein the one or more optical amplifiers include one or more fiber amplifiers with optical fibers coupled to one or more corresponding pumping sources.

7. The system of claim 6, wherein the one or more corresponding pumping sources include one or more laser diodes.

8. The system of claim 6, wherein the one or more optical fibers each include a cladding and a doped core.

9. The system of claim 8, wherein radiation from the one or more corresponding pumping sources is optically coupled to the cladding.

10. The system of claim 8, wherein radiation from the one or more corresponding pumping sources is optically coupled to the doped core.

11. The system of claim 8, wherein the doped core is doped with one or more rare earth elements.

12. The system of claim 11, wherein the one or more rare earth elements include ytterbium (Yb), erbium (Er), neodymium (Nd), holmium (Ho) samarium (Sm) and thulium (Tm), or combinations of two or more of these.

13. The system of claim 6, further comprising a controller operably coupled to the seed source and/or the one or more pump sources.

14. The system of claim 13, wherein the controller is configured to implement hardware or software logic adapted to control a power of the seed radiation provided by the seed source and/or control a power of pump radiation provided by the one or more pump sources.

15. The system of claim 1, wherein the seed source includes a diode laser pumped by driving electric current through a diode.

16. The system of claim 15, wherein the laser diode is a distributed Bragg reflector (DBR) laser diode, distributed feedback (DFB) laser diode, or Fabry-Perot laser diode.

17. The system of claim 1, wherein the seed source includes a diode-pumped solid state (DPSS) laser.

18. The system of claim 17, wherein the DPSS laser is a passively Q-switched, a mode-locked laser.

19. The system of claim 1, wherein the seed source is configured to run continuous wave (CW) or quasi-CW.

20. The system of claim 1, wherein the input face of the SHG crystal is oriented an oblique angle of incidence with respect to the fundamental input beam to expand the fundamental beam in the non-walkoff direction of the SHG crystal at the input face.

21. The system of claim 1, wherein the output face of the THG crystal is oriented at less than a Brewster angle with respect to the third harmonic beam.

22. The system of claim 1, wherein the third harmonic beam is angularly separated from the fundamental and second harmonic beams by an angle greater than an angular divergence of the beams.

23. The system of claim 1, wherein an average power of the third harmonic beam is greater than about 30 W.

24. The system of claim 1, wherein the input face of the SHG crystal is oriented within about 5 degrees of Brewster angle with respect to the input fundamental beam.

25. The system of claim 1, wherein the output face of the THG crystal is oriented at a near-20 degree incident angle with respect to the residual fundamental and second harmonic beams where the residual fundamental and second harmonic beams are incident at the output face of the THG crystal.

26. The system of claim 1, wherein the output face of the THG crystal is oriented at an incident angle with respect to the residual fundamental and second harmonic beams where the residual fundamental and second harmonic beams are incident at the output face of the THG crystal, wherein the incident angle is selected to optimize net efficiency of conversion of the fundamental beam to third harmonic radiation.

27. An extra cavity harmonic generator system configured to produce a round, non-astigmatic third harmonic output beam from a nominally round, non-astigmatic, diffraction limited input fundamental beam, the system comprising:

a first nonlinear crystal having an input face oriented at an angle of incidence with respect to the input fundamental beam wherein the fundamental beam size is expanded in a non-walkoff direction for the first nonlinear crystal at the input face, the first nonlinear crystal being configured to generate a first output beam from the input fundamental beam;

a second nonlinear crystal having an output face oriented at an oblique angle of incidence in a non-walkoff direction for the second nonlinear crystal such that a second output beam size is contracted in this direction, the second nonlinear crystal being configured to generate a second output beam from the first output beam and a residual fundamental beam from the first nonlinear crystal;

wherein an expansion of the input fundamental beam at the input face of the first nonlinear crystal exceeds a reduction of the second output beam at the output face of the second nonlinear crystal.

28. The system of claim 27, further comprising a controller operably coupled to the seed source.

29. The system of claim 28, wherein the controller is configured to implement hardware or software logic adapted to control a power of the seed radiation provided by the seed source.

30. The system of claim 27, further comprising one or more optical amplifiers optically coupled to the seed source and configured to amplify the seed radiation to generate amplified radiation that serves as input radiation for the input fundamental beam.

31. The system of claim 30, wherein the one or more optical amplifiers include a pre-amplifier optically coupled in series between the seed source and a power amplifier.

32. The system of claim 30, wherein the one or more optical amplifiers include one or more fiber amplifiers with optical fibers coupled to one or more corresponding pumping sources.

33. The system of claim 32, wherein the one or more corresponding pumping sources include one or more laser diodes.

34. The system of claim 32, wherein the one or more optical fibers each include a cladding and a doped core.

35. The system of claim 34, wherein radiation from the one or more corresponding pumping sources is optically coupled to the cladding.

36. The system of claim 34, wherein radiation from the one or more corresponding pumping sources is optically coupled to the doped core.

37. The system of claim 34, wherein the doped core is doped with one or more rare earth elements.

38. The system of claim 37, wherein the one or more rare earth elements include ytterbium (Yb), erbium (Er), neodymium (Nd), holmium (Ho) samarium (Sm) and thulium (Tm), or combinations of two or more of these.

39. The system of claim 32, further comprising a controller operably coupled to the seed source and/or the one or more pump sources.

40. The system of claim 39, wherein the controller is configured to implement hardware or software logic adapted to control a power of the seed radiation provided by the seed source and/or control a power of pump radiation provided by the one or more pump sources.

41. The system of claim 27, wherein the seed source includes a diode laser pumped by driving electric current through a diode.

42. The system of claim 41, wherein the laser diode is a distributed Bragg reflector (DBR) laser diode, distributed feedback (DFB) laser diode, or Fabry-Perot laser diode.

43. The system of claim 27, wherein the seed source includes a diode-pumped solid state (DPSS) laser.

44. The system of claim 43, wherein the DPSS laser is a passively Q-switched, a mode-locked laser.

45. The system of claim 27, wherein the seed source is configured to run continuous wave (CW) or quasi-CW.

46. The system of claim 27, further comprising a third nonlinear crystal configured to generate a third output beam from the second output beam and a second residual fundamental beam from the second nonlinear crystal.

* * * * *